March 12, 1940. T. F. PEARSON 2,193,376
MACHINE FOR THE MANUFACTURE OF GLASS ARTICLES
Filed June 17, 1937 3 Sheets-Sheet 1
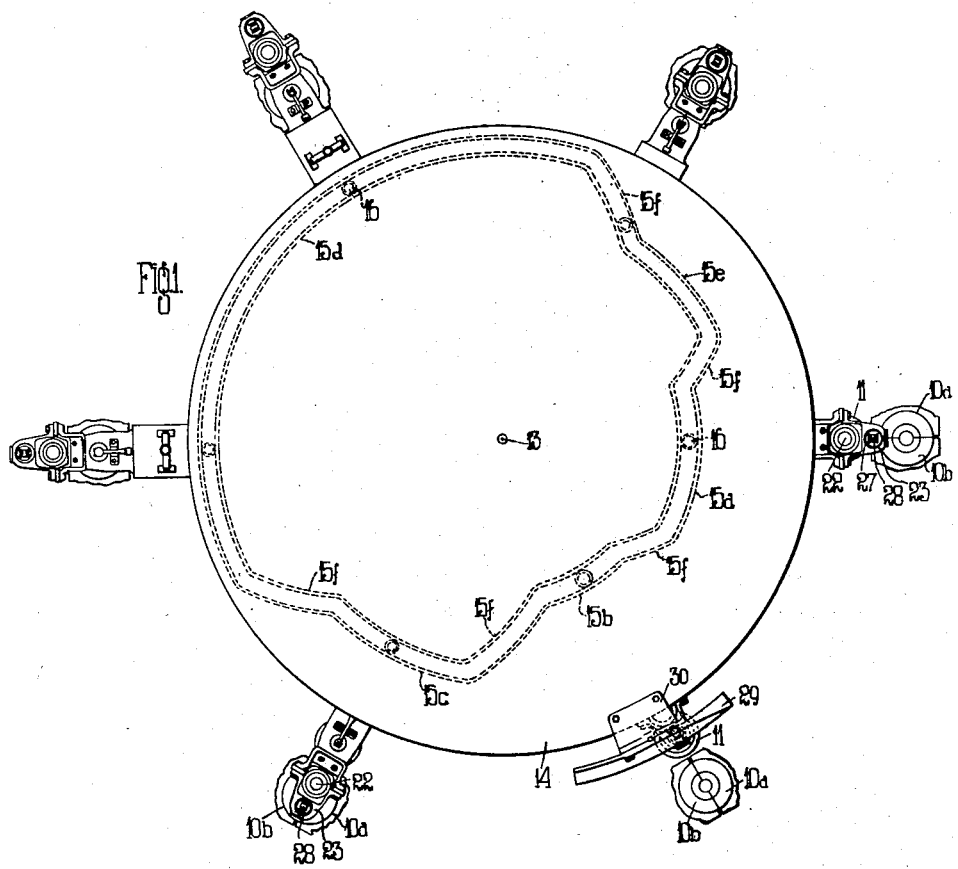
Inventor
Thomas Finney Pearson
J. J. V. Armstrong
Attorneys March 12, 1940. T. F. PEARSON 2,193,376
MACHINE FOR THE MANUFACTURE OF GLASS ARTICLES
Filed June 17, 1937 3 Sheets-Sheet 2
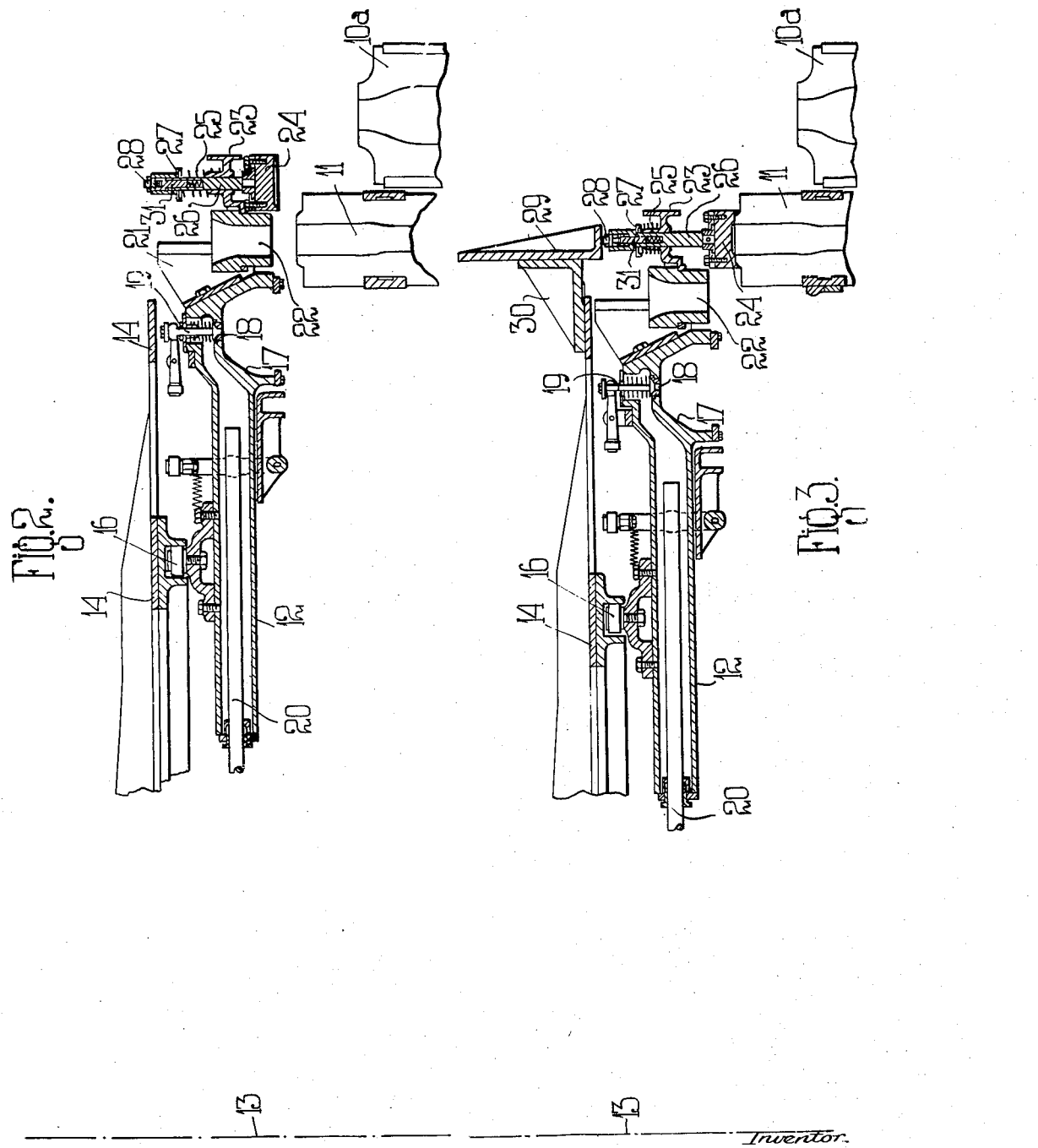
Inventor
Thomas Finney Pearson
J. J. V. Armstrong
Attorneys

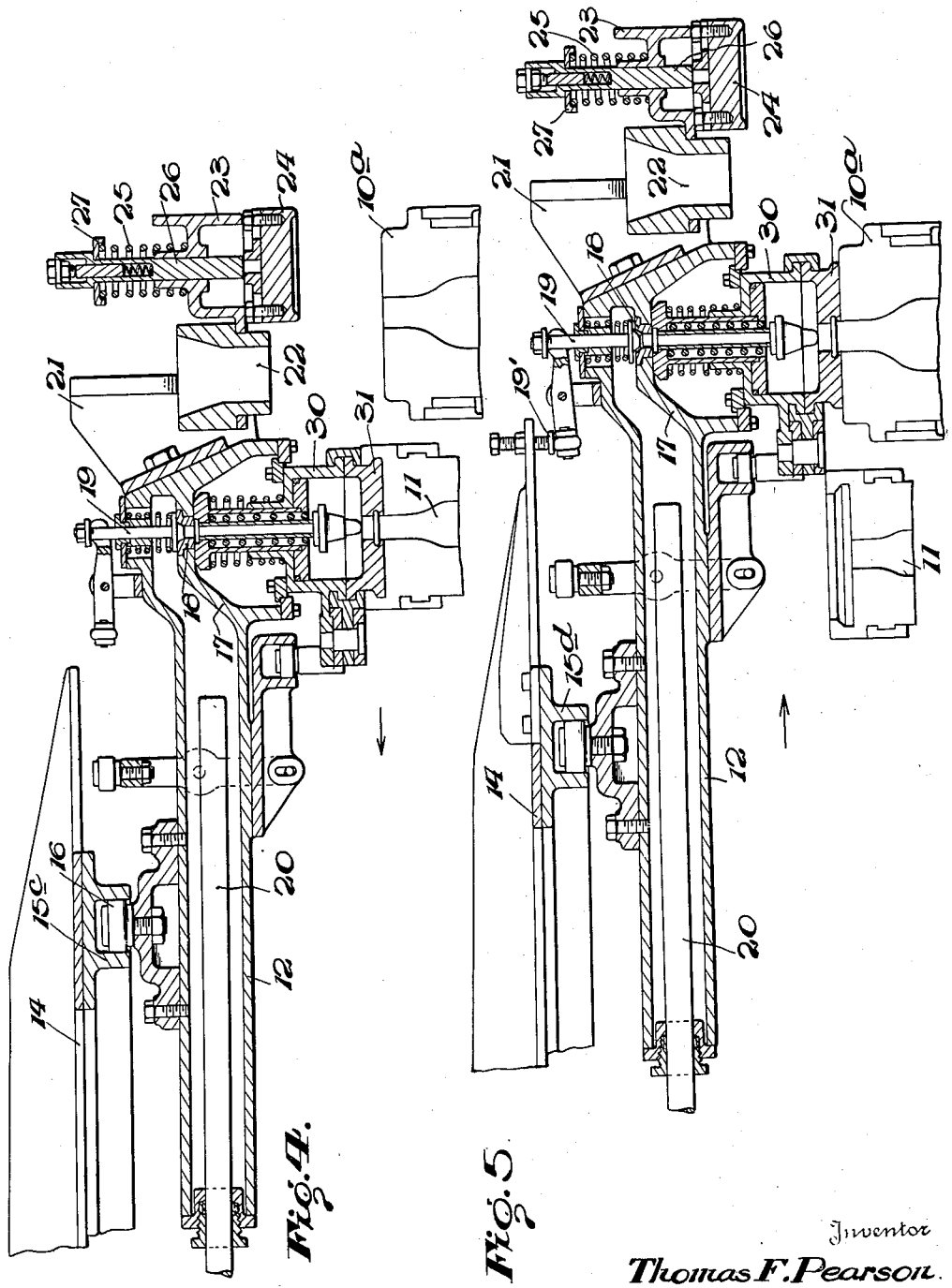

Patented Mar. 12, 1940

2,193,376

UNITED STATES PATENT OFFICE 2,193,376

MACHINE FOR THE MANUFACTURE OF GLASS ARTICLES

Thomas Finney Pearson, Pontefract, England, assignor to Crown Cork & Seal Company, Inc., New York, N. Y., a corporation of New York Application June 17, 1937, Serial No. 148,771
In Great Britain June 23, 1936

8 Claims. (Cl. 49—5)

The present invention relates to glass forming machines of the type in which glass charges are dropped into a number of moulds in sequence and then partly or wholly blown therein.

The object of the present invention is to provide relatively simple means for guiding charges of glass in succession to the moulds and subsequently for closing the moulds during rotation of the moulds about the axis of the table on which the moulds are mounted.

According to the present invention a funnel guiding the charge to a parison mould and a baffle plate for closing the opening of the parison mould are supported on a reciprocating slide member so that the funnel may be displaced to a position co-axial with the parison mould and then be subsequently displaced out of said position to permit the baffle plate to be brought into a position to close one end of the mould for partial blowing of the charge therein.

Preferably the funnel and the plate are rigidly mounted on the slide member and at the free end thereof, whilst the latter incorporates a conduit through which blowing air passes for the purpose of completing the blowing operation on each charge.

Where a plurality of parison moulds are mounted on a rotary machine to be fed with charges of glass successively a similar number of reciprocating slides are provided each carrying a baffle plate and a funnel, the slide members during angular displacement with the machine being reciprocated towards and away from the axis of rotation thereof, to bring the funnels and the baffle plates into position co-axially with their parison moulds at the required times.

Conveniently the neck moulds may be carried by the reciprocating slides so that the latter in addition to their radial displacement to bring the funnels and then the baffles into positions co-axial with the parison moulds, may also be radially displaced to transfer the neck moulds and the suspended parisons from the parison moulds to the blow moulds when required. For this purpose one or more cam guides may be provided, preferably on a stationary part of the machine such as the cover, which cam guides are engaged by rollers on the ends of the slide members as the latter travel circumferentially around the axis of the machine.

The invention is more particularly described with reference to the accompanying drawings in which:

Figure 1 is a plan view of a rotary forming machine showing a number of funnels and baffle plates divided into six spaced units rotating about a common axis beneath the top of a support of a rotary table, each unit including a blow mould, a parison mould, and a radially reciprocating slide.

Figure 2 is a sectional elevation through the outer end of a unit when the funnel thereof lies above its parison mould to allow a charge to be fed thereto.

Figure 3 is a sectional elevation through the outer end of a unit when the baffle thereof lies above its parison mould to close the latter.

Figure 4 is a view similar to Figures 2 and 3 when the parison mould has been re-inverted.

Figure 5 is a similar view showing the parts after the transfer of the blow head and neck ring from the parison mould to the blow mould.

In the construction according to the drawings the machine with the exception of the manner in which the funnel and the baffle plate are operated, is similar to that described in the specification of my copending application, Serial No. 111,517, which has matured into Patent 2,163,103, dated June 20, 1939, in that six units each comprising carrier sections 10a, 10b of a blow mould, a parison mould 11 and a reciprocable slide 12 are adapted to rotate continuously in sequence about a vertical axis 13 of a rotary table (not shown) but which has a stationary cover 14.

On the lower face of the cover 14 a cam track is provided which is made up of portions 15a, 15b, 15c, 15d and 15e, with intervening portions 15f to enable each roller 16 of a reciprocable slide 12 to traverse each of the portions 15a, 15b, 15c, 15d and 15e in succession.

It will be appreciated that during traverse of the roller along the parts 15a . . . 15e of the cam track the outer end of the slide traverses an arc the centre of which is the axis of rotation 13 of the table while during traverse of the parts 15f the slide member 12 in addition to its rotary movement about said axis 13 is displaced radially thereof.

A hollow head 17 as described in the specification of my co-pending application, Serial No. 111,517 is provided at the end of each hollow slide 12 and is adapted to receive a charge of blowing air through a port 18 under the control of a valve 19 the blowing air supply being through a pipe 20 which rotates with the machine and about which the slide 12 is axially reciprocable.

As shown in Figures 4 and 5 a blow head 30 and neck ring assembly 31, similar to that described in detail in my copending applications Serial Nos. 111,517 and 100,944, is carried by the end of the parison mould 11, and is adapted to be inserted into the hollow head 17 of the slide 12 when the parison mould is re-inverted. Figure 4 illustrates the relation of parts when the parison mould with the blown parison therein has been re-inverted and the blow head assembly received in the head 17. As explained in the aforesaid application Serial No. 111,517, the transfer of the parison from the parison mould to the blow mould is effected by opening the parison mould, leaving the parison suspended in the neck ring, by moving the slide 12, the head 17, the blow head 30 and the neck ring 31 outwardly into alignment with the blow mould, and by closing the blow mould about the suspended parison. This relation of parts is illustrated in Figure 5, wherein the movable elements just mentioned have been projected outwardly so that the neck ring 31 is in alignment with the blow mould 10a. The valve 19 is opened by a cam 19', to admit blowing air through the port 18 to blow the parison to finished form in the blow mould.

The outer end of the hollow head 17 of each unit has a bracket 21 fixed thereto to which a tapered funnel 22 and a baffle support 23 are rigidly connected.

As will be seen from the drawings, the baffle support 23 lies radially outwardly of the funnel 22, that is to say its path of travel is about a greater radius than that of the funnel 22. A baffle plate 24 is resiliently carried by the support 23 and is mounted on one end of a spindle 26 passing through the support 23 with a spring located between the support 23 and a shoulder or cap 27 on the spindle 26. The spindle is recessed to receive a resiliently leaded plunger 31 which at its upper end carries a roller 28 which is adapted to be engaged by a cam 29 fixed in overhanging relationship to a bracket 30 at one part of the rim of the top 14 of the support for the table.

In operation, when the roller 16 of the slide 12 of each unit in turn traverses the part 15a of the cam track the hollow slide 12 of such unit takes up that radial position in which the funnel 22 lies above an inverted parison mould 11 of its unit so that a charge of glass from a feeder located above the funnel 22 is guided by said funnel into the inverted parison mould. On moving in a clockwise direction along a part 15f towards the part 15b of the cam track the roller is displaced radially inwardly towards the axis of rotation and thus in turn inwardly displaces the slide member 12 to bring the baffle plate 24 above the parison mould 11 which is still inverted. On entering the part 15b of the cam track the baffle plate 24 which is now immediately above the inverted parison mould 11 is depressed into engagement with the inverted base of the parison mould due to the action of the cam 29 on the roller or plunger 28 of the spindle 26 of the baffle plate 24. As a result the baffle plate is held on the parison mould to close one end thereof in order to allow compacting and initial blowing of the charge in the inverted parison mould to be effected in the manner described in the specification of my copending patent applications Nos. 111,517 and 120,076.

On leaving the part 15b of the cam track the roller 16 of the slide member 12 is displaced radially outwardly until it reaches the part 15c of the cam track and in this position the hollow head 17 lies above its corresponding parison mould 11 which is re-inverted so that the hollow head 17 picks up the blow head and neck ring assembly 30, 31, as shown in Figure 4, to effect the transfer of the assembly to the blow mould of the unit. The parison mould sections 11 now open, and the roller then leaves the part 15c of the cam track and moves towards the part 15d to effect the transfer of the blow head 30, the neck ring 31 and the suspended parison from the parison mould to the blow mould, and during its traverse along this part the hollow head 17 and the parts supported thereby are positioned above their corresponding blow mould carried in the mould carrier sections 10a, 10b. Pressure air to blow the parison to finished form is supplied through the pipe 20, the valve 18, blow head 30 and neck ring 31 carried by the hollow head 17 to said blow mould.

At the conclusion of the finish blowing operation, the blowing air supply is cut off by the valve 19 under the control of the cam 19' and the neck ring 31 is opened, in the manner described in my copending applications identified above, leaving the finished bottle in the blow mould, but freeing the neck ring and blow head therefrom. On leaving the part 15d of the cam track the roller 16 is displaced inwardly until it reaches the part 15e in which position the slide member 12, blow head 30, neck ring 31, the funnel 22 and the baffle 24 are in the same positions relative to the blow mould 10 and parison mould 11 as when the roller is traversing the part 15c. In other words, the blow head and neck ring assembly lie above the neck end of the parison mould. The neck ring is now closed, the parison mould is closed to embrace the neck ring, as shown in Figure 4, and the parison mould is inverted, swinging the neck ring and blow head out of the open end 17 of the slide 12 and carrying the blow head assembly downwardly.

The cycle of operation is completed when the roller leaves the part 15e and enters the part 15a of the cam track to bring the funnel 22 back to a position above the parison mould 11 which by this time has again been inverted to receive the charge.

I declare that what I claim is:

1. A glassware forming machine comprising a stationary support, a cam track on said stationary support, a plurality of units each comprising a parison mould, a blow mould, a slide member, and blowing air connections mounted for movement with the slide for delivering air to the blow mould, said units being rotatable in sequence about a common axis on said support with the parison mould of each unit displaceable in a circular path within the path of travel of each blow mould, a funnel carried by each slide member, a baffle plate carried by each slide member and means carried by each slide member for engagement with said cam track on said support for moving the slide during rotation thereof, successively bringing the funnel and the baffle plate of each unit above the parison mould thereof, and moving said blowing connections into cooperative relation to the blow mould.

2. A glassware forming machine comprising a parison mould, a blow mould and a hollow slide member forming a conduit for pressure air to said blow mould, a blow head mounted for movement with said slide for delivering said pressure air from the conduit to the blow mould to blow a parison to finished form therein, said moulds, the slide member and the blowing head being rotatable as a unit about a common axis, a funnel carried by said hollow slide member, a baffle carried by said hollow slide member and means during each complete revolution of said unit about its axis for displacing said hollow slide member radially to bring said funnel and said baffle successively into position above said parison mould and then for bringing the blow head into cooperative relation to said blow mould.

3. A glassware forming machine comprising a blow mould and a parison mould, a hollow slide mounted for reciprocation between positions cooperating with the parison mould and blow mould respectively, a blow head mounted for movement with said slide and being adapted in the last-mentioned position of the slide to deliver air under pressure to the blow mould to blow a bottle to finished form therein, a funnel carried by the slide, a baffle plate carried by the slide, and means for reciprocating the slide to bring the funnel and the baffle plate successively into registry with the parison mould, said means for reciprocating the slide also serving to bring the blow head into cooperative relation to said blow mould, for the purposes described.

4. A glassware forming machine comprising a blow mould and a parison mould, a hollow slide mounted for reciprocation between positions cooperating with the parison mould and blow mould respectively, a blow head mounted for movement with said slide and being adapted in the last-mentioned position of the slide to deliver air under pressure to the blow mould to blow a bottle to finished form therein, a funnel carried by the slide, a baffle plate carried by the slide, and cam means for reciprocating the slide to bring the funnel and the baffle plate successively into registry with the parison mould, first to guide a charge of glass into the mould and then to close the mould for counter-blowing of a parison therein, said cam means also serving to move the slide to bring said blow head into cooperative relation to said blow mould, for the purposes described.

5. A glassware forming machine comprising a blow mould, a parison mould, a hollow, reciprocable slide rotatable about a common axis, and a blow head and neck ring assembly adapted to be supported by said slide for movement therewith from a position cooperating with the parison mould to a position cooperating with the blow mould to transfer a parison from the parison mould to the blow mould and to deliver air under pressure to the blow mould to blow a bottle to finished form therein, a funnel carried by the slide, a baffle plate carried by the slide, and means for reciprocating the slide to bring the funnel and the baffle plate successively into registry with the parison mould, first to guide a charge of glass in the parison mould and then to close the mould during counter-blowing of a parison therein, said means also serving to transfer said blow head and neck ring assembly from the parison mould to the blow mould.

6. In a glassware forming machine comprising a blow mould and a parison mould rotatable about a common axis and spaced apart in radial alignment with respect thereto, a hollow slide rotatable about said axis and slidable radially with respect thereto, a blow head and neck ring assembly mounted for movement with said slide and being adapted to cooperate in one position of the slide with the blow mould to deliver air under pressure thereto to blow a bottle to finished form therein, a funnel and a baffle plate, both carried by the slide, and means for reciprocating the slide to bring the funnel and the baffle plate successively into registry with the parison mould, and to bring said blow head and neck ring assembly into cooperative relation to said blow mould.

7. In a glassware forming machine including a parison mould and a blow mould, a slide, a funnel, a baffle plate, and bottle blowing means, all carried by the slide, and means for reciprocating the slide to cause the same to assume three different positions successively, said slide in the first position serving to bring the funnel in alignment with the parison mould to guide a charge of glass thereinto, in the second position serving to register the baffle plate with the parison mould and in the third position serving to register said blowing means with the blow mould to blow a parison into the form of a finished bottle therein.

8. In a machine of the class described, a plurality of glassware forming units mounted for rotation about a common axis, each unit comprising a parison mould, a blow mould, a reciprocable slide, a funnel and a baffle plate carried by the slide, and a blow head and neck ring assembly adapted to be connected to and supported by the slide for movement therewith from a position cooperating with the parison mould to a position cooperating with the blow mould to transfer a formed parison from the former to the latter, and means for reciprocating the slide to cause the same to assume four different positions successively, said slide in the first position serving to bring the funnel into alignment with the parison mould to guide a charge of glass thereinto, in the second position serving to register the baffle plate with the parison mould, in the third position serving to effect connection between the slide and the blow head and neck ring assembly while the latter is in cooperative relation to the parison mould, and in the fourth position serving to register the assembly with the blow mould, to effect a transfer of the parison and to blow the same to finished form in the blow mould.

THOMAS FINNEY PEARSON.